US012640631B1

(12) United States Patent
    Zhu

(10) Patent No.: US 12,640,631 B1
(45) Date of Patent: May 26, 2026

(54) METHOD OF ALIGNING A STATIONARY ROTOR OF A SYNCHRONOUS MOTOR AT A CONFIGURED ROTOR ANGLE AND A CONTROLLER THEREFOR

(71) Applicant: KINETIC TECHNOLOGIES INTERNATIONAL HOLDINGS LP, Toronto (CA)

(72) Inventor: Feng Zhu, Shatin (HK)

(73) Assignee: Kinetic Technologies International Holdings LP, Toronto (CA)

( * ) Notice: Subject to any disclaimer, the term of this patent is extended or adjusted under 35 U.S.C. 154(b) by 191 days.

(21) Appl. No.: 18/222,920

(22) Filed: Jul. 17, 2023

(51) Int. Cl.
    *H02P 21/18* (2016.01)
    *H02K 15/16* (2006.01)
    *H02K 21/26* (2006.01)
    *H02P 21/09* (2016.01)

(52) U.S. Cl.
    CPC ............. *H02K 15/16* (2013.01); *H02K 21/26* (2013.01); *H02P 21/09* (2016.02); *H02K 2213/03* (2013.01)

(58) Field of Classification Search
    CPC .... H02K 15/16; H02K 21/26; H02K 2213/03; H02P 21/09
    See application file for complete search history.

(56) References Cited

U.S. PATENT DOCUMENTS

| | | | |
|---|---|---|---|
| 4,088,934 A | 5/1978 | D'Atre et al. | |
| 8,018,187 B2 | 9/2011 | Schulz et al. | |

| | | | |
|---|---|---|---|
| 10,291,160 B1 * | 5/2019 | Latham | ................... H02P 21/13 |
| 2004/0257027 A1 | 12/2004 | Matsuo et al. | |
| 2010/0283252 A1 | 11/2010 | Fradella | |
| 2010/0320953 A1 | 12/2010 | Yeh et al. | |
| 2013/0175955 A1 | 7/2013 | Son et al. | |
| 2015/0291207 A1 | 10/2015 | Ballal et al. | |

(Continued)

FOREIGN PATENT DOCUMENTS

| | | |
|---|---|---|
| CN | 110661466 A | 1/2010 |
| CN | 102684595 A | 9/2012 |

(Continued)

OTHER PUBLICATIONS

Application Note: AN1078:Sensorless Field Oriented Control of a PMSM; Authors: Jorge Zambada and Debraj Deb; 2010, Published by Microchip Inc.*

(Continued)

*Primary Examiner* — Muhammad S Islam

(74) *Attorney, Agent, or Firm* — Sheppard Mullin Richter & Hampton LLP

(57) ABSTRACT

Described is a method of aligning a stationary rotor of a polyphase synchronous motor having a permanent magnet rotor to a configured rotor angle (θ). The method includes determining corresponding polyphase drive voltages for the synchronous motor based on a user-specified value of a two-axis synchronously rotating reference frame vector voltage (V) for a selected one of two axis of the two-axis synchronously rotating reference frame. Then, determining corresponding polyphase drive voltages for the synchronous motor; and applying said polyphase drive voltages for a predetermined, selected, or calculated time period to rotate the stationary rotor to align said rotor with said configured rotor angle (θ).

21 Claims, 8 Drawing Sheets

(56)                    References Cited

U.S. PATENT DOCUMENTS

| | | | | |
|---|---|---|---|---|
| 2017/0353134 | A1* | 12/2017 | Dutta | ......................... H02P 9/08 |
| 2018/0109218 | A1 | 4/2018 | Huh et al. | |
| 2021/0111647 | A1 | 4/2021 | Kalygin et al. | |
| 2022/0115919 | A1* | 4/2022 | Nashiki | .................. H02K 1/146 |
| 2022/0190762 | A1 | 6/2022 | Liu et al. | |

FOREIGN PATENT DOCUMENTS

| | | |
|---|---|---|
| CN | 111193451 A | 5/2020 |
| TW | 202112051 A | 3/2021 |

OTHER PUBLICATIONS

PCT International Search Report and the Written Opinion mailed Oct. 10, 2022, issued in related International Application No. PCT/CN2022/106537 (9 pages).

Search Report dated Mar. 31, 2023, issued in related Taiwan Application No. 111130669 (2 pages).

Notice of Allowance mailed Aug. 8, 2023, issued in related U.S. Appl. No. 17/462,846 (9 pages).

Notice of Allowance mailed Nov. 16, 2023, issued in related U.S. Appl. No. 17/462,846 (9 pages).

"Sensorless PMSM Field-Oriented Control," Freescale Semiconductor, Document No. DRM148, 2016.

Jorge Zambada, "Sensorless Field Oriented Control of PMSM Motors", Microchip Technology Inc., AN1078, 2007, pp. 1-30.

Wei Xu et al., "Improved Rotor Flux Observer for Sensorless Control of PMSM with Adaptive Harmonic Elimination and Phase Compensation," CES Transactions on Electrical Machines and Systems, vol. 3, No. 2, Jun. 2019, pp. 151-159.

Non-Final Office Action dated Mar. 28, 2023, issued in related U.S. Appl. No. 17/462,846 (13 pages).

\* cited by examiner

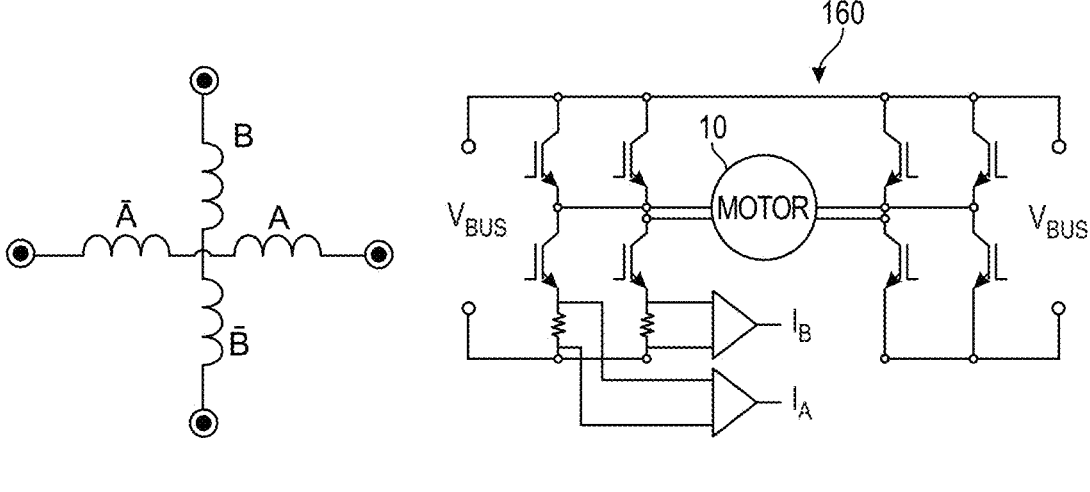
FIG. 12                  FIG. 13

METHOD OF ALIGNING A STATIONARY ROTOR OF A SYNCHRONOUS MOTOR AT A CONFIGURED ROTOR ANGLE AND A CONTROLLER THEREFOR

FIELD OF THE INVENTION

The invention relates to a method of aligning a stationary rotor of a synchronous motor to a configured rotor angle and a controller therefor. The method relates particularly, but not inclusively to a method of aligning a stationary rotor of a permanent magnet synchronous motor (PMSM) having a sensorless closed-loop control system for synchronous operation to a configured rotor angle.

BACKGROUND OF THE INVENTION

The most common types of multi-phase, e.g., three-phase, motors are synchronous motors and induction motors. When three-phase electric conductors are placed in certain geometrical positions, which means at a certain angle from one another, an electrical field is generated. The rotating magnetic field rotates at a certain speed known as the synchronous speed. If a permanent magnet or electromagnet is present in this rotating magnetic field, the magnet is magnetically locked with the rotating magnetic field and consequently rotates at the same speed as the rotating field which results in a synchronous motor, as the speed of the rotor of the motor is the same as the speed of the rotating magnetic field.

A permanent magnet motor uses permanent magnets in the rotor to provide a constant magnetic flux which has a sinusoidal back-electromotive force (emf) signal. The rotor locks in when the speed of the rotating magnetic field in the stator is at or near synchronous speed. The stator carries windings which are connected to a controller having a power stage including a voltage supply, typically an alternating current (AC) voltage supply, to produce the rotating magnetic field. Such an arrangement constitutes a PMSM.

PMSMs are similar to brushless direct current (BLDC) motors. BLDC motors can be considered as synchronous DC motors which use a controller having a power stage including a DC voltage supply, suitably converted, to produce the stator rotating magnetic field. BLDC motors therefore use the same or similar control algorithms as AC synchronous motors, especially PMSM motors.

Previously, it has been common in synchronous motor control systems to use at least one sensor, such as a Hall sensor, to detect the rotational position of the rotor during synchronous operation. However, sensorless motor control systems are now preferred.

Such sensorless motor control systems typically include a rotor position and speed estimation module where, during synchronous operation, rotor position and speed can be continuously estimated based on the back-emf induced by the rotating rotor. The estimated rotor positions and speeds are utilized to update and/or compensate the motor control signals during synchronous operation thereby providing sensorless closed-loop synchronous operation motor control.

One problem with sensorless motor control systems is that, when the motor has stopped, the rotor angle of the stationary rotor is unknown. This can lead to significant issues on start-up of the motor including possible reverse rotation of the rotor which is not acceptable for some motor applications.

FIG. 1 is a block schematic diagram illustrating a three-phase synchronous motor with a closed-loop controller illustrating a known method of parking a rotor of the motor in a fixed rotor position. In this case, the rotor is aligned on stopping to one fixed rotor position. This is achieved by injecting direct current (DC) into two of the three motor phases. In the example, shown, DC is injected into the U and V phases. As also shown in FIG. 1, DC injection is implemented by switching on an upper side drive transistor (denoted as "1" in FIG. 1) for the U phase and switching on a lower side drive transistor (denoted as "4" in FIG. 1) for the V phase. Neither of the drive transistors of the W phase are switched on. This method allows no variation or user selection in the fixed rotor stop position.

Among other things, what is therefore desired is an improved method of aligning the rotor to a configured rotor angle.

SUMMARY OF THE INVENTION

An object of the invention is to mitigate or obviate to some degree one or more problems associated with known methods of aligning the rotor to a predetermined, selected, or specified rotor angle.

The above object is met by the combination of features of the main claims; the sub-claims disclose further advantageous embodiments of the invention.

Another object of the invention is to provide a method of aligning the stationary rotor to a configured rotor angle for a PMSM having a sensorless closed-loop control system for synchronous operation.

Another object of the invention is to provide an improved method of starting a synchronous motor having a sensorless closed-loop control system for synchronous operation.

One skilled in the art will derive from the following description other objects of the invention. Therefore, the foregoing statements of object are not exhaustive and serve merely to illustrate some of the many objects of the present invention.

In a first main aspect, the invention provides a method of aligning a stationary rotor of a polyphase synchronous motor having a permanent magnet rotor to a configured rotor angle (θ). The method comprises determining corresponding polyphase drive voltages for the synchronous motor based on a user-specified value of a two-axis synchronously rotating reference frame vector voltage (V) for a selected one of two axis of the two-axis synchronously rotating reference frame. Then, determining corresponding polyphase drive voltages for the synchronous motor; and applying said polyphase drive voltages for a predetermined, selected, or calculated time period to rotate the stationary rotor to align said rotor with said configured rotor angle (θ). The polyphase drive voltages are preferably applied by suitable PWM drive signals.

In a second main aspect, the invention provides a method of aligning a stationary rotor of a polyphase synchronous motor having a permanent magnet rotor to a user-specified rotor parking angle (θ), the method comprising the steps of: determining a value of a two-axis synchronously rotating reference frame vector voltage (V) for a selected one of two axis of the two-axis synchronously rotating reference frame based on the user-specified rotor parking angle (θ); determining corresponding polyphase drive voltages for the synchronous motor based on the value of the two-axis synchronously rotating reference frame vector voltage (V) for the selected one of two axis of the two-axis; and applying said polyphase drive voltages for a predetermined, selected or calculated time period to rotate the stationary rotor to align said rotor with said user-specified rotor parking angle (θ).

In a third main aspect, the invention provides a closed-loop method of starting a synchronous motor having a permanent magnet rotor, the method comprising the method steps of the first main aspect of the invention or second main aspect of the invention and then controlling start-up of the motor using a closed-loop synchronous operation motor control algorithm based on the configured rotor angle (θ).

In a fourth main aspect, the invention provides a closed-loop controller for a synchronous motor having a permanent magnet rotor, said controller comprising a non-transitory computer-readable medium storing machine-readable instructions and a processor, wherein, when the machine-readable instructions are executed by said processor, they configure the controller to park the stationary rotor at a configured rotor angle (θ) by implementing the method steps of the first main aspect of the invention or second main aspect of the invention.

In a fifth main aspect, the invention provides a synchronous motor including a closed loop controller according to the fourth main aspect of the invention.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which:

FIG. 12 is a schematic diagram showing a four-wire configuration of stator windings of a synchronous motor in which the closed-loop start-up method in accordance with the invention can be implemented; and FIG. 13 is a schematic block diagram of a power stage for the closed-loop motor control system in accordance with the invention for the synchronous motor of FIG. 12.

DESCRIPTION OF PREFERRED EMBODIMENTS

Figure 1:
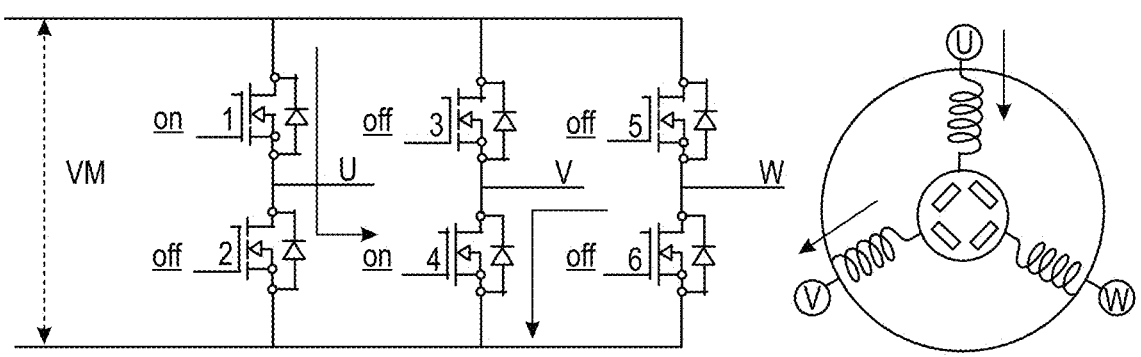
FIG. 1 is a block schematic diagram illustrating a synchronous motor with a closed-loop controller illustrating a known method of parking a rotor in a fixed rotor position.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS. may be implemented in various forms of hardware, software, or combinations thereof. These elements may be implemented in a combination of hardware and software on one or more appropriately programmed general-purpose devices, which may include a processor, a memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

References herein to "rotor angle" are to be taken as references to "rotor position". References herein to "stator angle" are to be taken as references to "commutation angle". References herein to "stationary rotor" are references to a motor where the rotor is not rotating and not being powered to rotate save for implementation of the method of the invention the steps of which are applied only once a rotor has come to a halt, i.e., not rotating, after synchronous operation and is no longer being driven, or is at a halt prior to normal start-up of the motor and is not being driven under a normal or conventional start-up scheme.

For sensorless synchronous motors, it is particularly advantageous if the stationary rotor angle is known on or prior to start-up, particularly for closed-loop start-up. For larger, heavy synchronous motors typically installed in fixed locations, it is advantageous to apply the method of the invention to align the stationary rotor after synchronous operation and after the rotor has come to a halt, i.e., after the rotor has become stationary and is no longer being driven, at a configured rotor angle. The configured rotor angle can be inputted to the motor controller as an operating parameter in the normal start-up procedure which provides many advantages compared to the situation where the stationary rotor angle on or prior to start-up is not known. For smaller synchronous motors used in mobile devices such as, for example, power tools, the method of the invention can also be implemented in the same manner when the rotor has come to a halt. This is preferably the case where it is determined that the rotor position once parked at the configured rotor angle will not likely be caused to move away from the configured rotor angle when the mobile device is moved and especially when it is subject to rough handling such as shocks and knocks. In the latter case where the stationary rotor position may drift due to movement of the device or rough handling, the method of the invention may be applied as an initial step in preparation for normal start-up of the motor.

The method of the invention can therefore comprise a first part of a control algorithm for starting and operating the synchronous motor. The invention therefore also relates to a method of and controller for starting a PMSM having a sensorless closed-loop controller for synchronous operation, but the method is applicable to any synchronous motor with a closed-loop controller for synchronous operation which utilizes the method as hereinafter described.

One of many advantages of the invention is that it can be implemented on an existing closed-loop controller for synchronous operation without significant modification save for changes in the controller's control algorithm or algorithms. The closed-loop control algorithm in accordance with the invention can be implemented by software, firmware, hardware, or any combination of the foregoing. It may be embodied as an application specific integrated circuit or chip.

Figure 2:
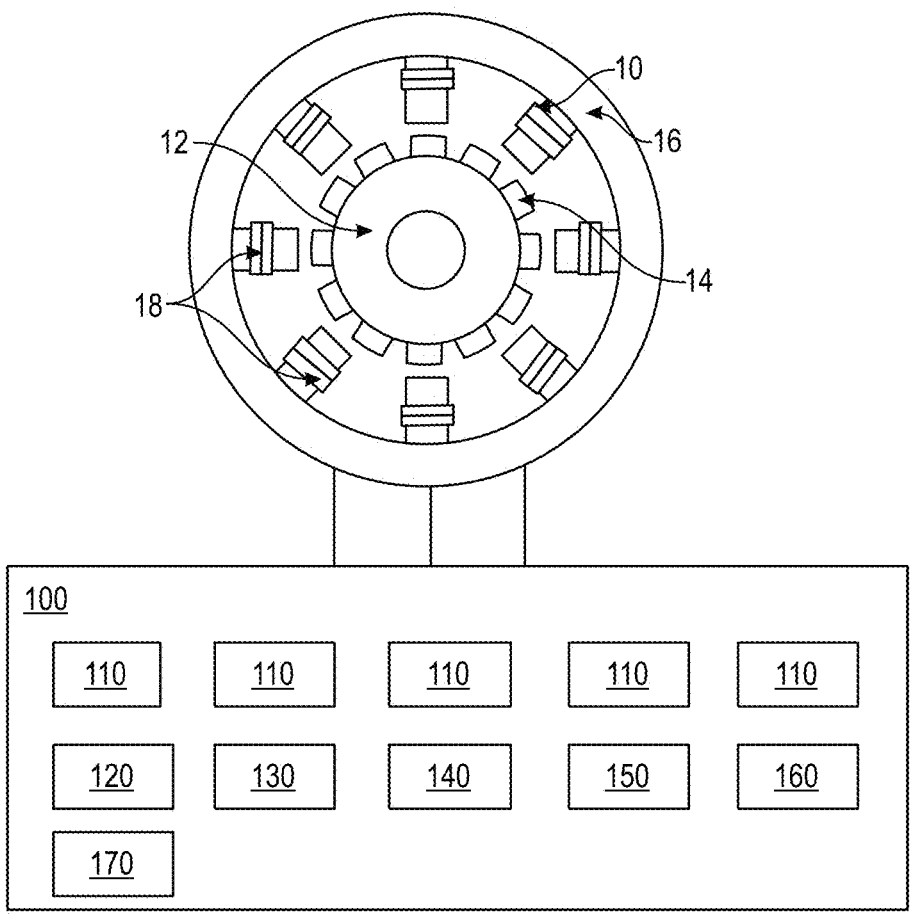
FIG. 2 is a block schematic diagram illustrating a synchronous motor with a closed-loop controller in accordance with the invention.

FIG. 2 shows an exemplary embodiment of an improved closed-loop controller 100 for a synchronous motor 10 in accordance with concepts of the present invention. The synchronous motor 10 has a permanent magnet rotor 12 with a plurality of permanent magnets 14 and a stator 16 with a plurality of stator windings 18. Whilst the synchronous motor 10 is shown with the stator 16 surrounding the rotor 12 in a conventional manner, it will be understood that the concepts of the present invention are equally applicable to a synchronous motor where the rotor surrounds the stator, i.e., the stator is arranged internally of the rotor.

In the illustrated embodiment, the closed-loop controller 100 may comprise a plurality of functional blocks 110 for performing various functions thereof. For example, the closed-loop controller 100 may comprise a suitably modified or suitably configured known vector-based closed-loop controller such as a direct torque control (DTC) closed-loop controller or a Field Oriented Control (FOC) closed-loop controller as described in the publication entitled "Sensorless Field Oriented Control of PMSM Motors" authored by Jorge Zambada, published by Microchip Technology Inc. in 2007 as paper AN1078, the content of which is incorporated herein by way of reference, and as illustrated in FIG. 2 herein but modified as described herein in accordance with the concepts of the invention.

The closed-loop controller 100 may, for example, be implemented using logic circuits and/or executable code/machine readable instructions stored in a memory for execution by a processor 120 to thereby perform functions as described herein. For example, the executable code/machine readable instructions may be stored in one or more memories 130 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 130 may comprise processor-readable memories for use with respect to one or more processors 120 operable to execute code segments of the closed-loop controller 100 and/or utilize data provided thereby to perform functions of the closed-loop controller 100 as described herein. Additionally, or alternatively, the closed-loop controller 100 may comprise one or more special purpose processors (e.g., application specific integrated circuit (ASIC), field programmable gate array (FPGA), graphics processing unit (GPU), and/or the like configured to perform functions of the closed-loop controller 100 as described herein.

7
8

Figure 3:
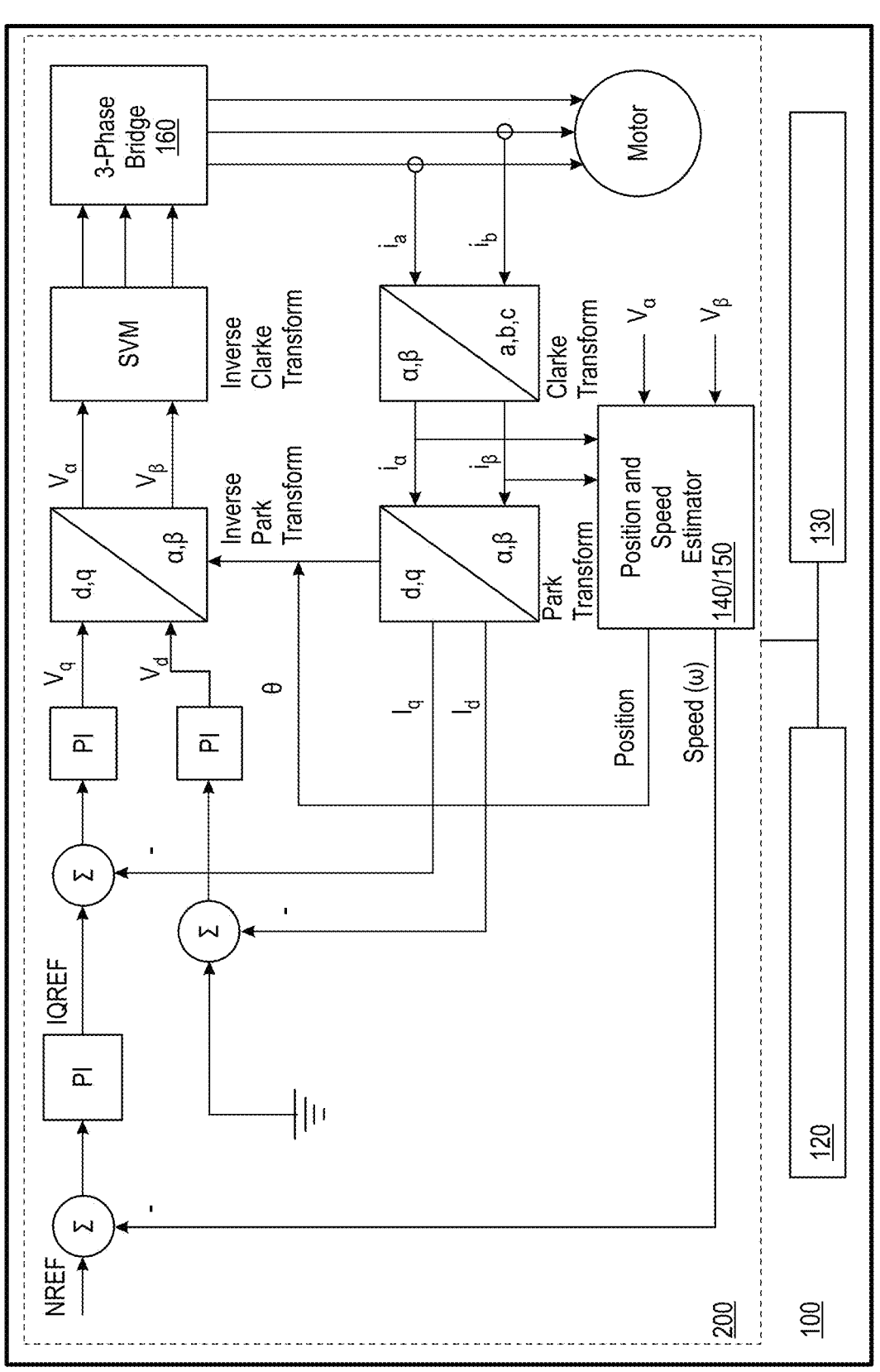
FIG. 3 is a detailed block schematic diagram of an embodiment of the closed-loop controller in accordance with the invention.

In a broad aspect, the invention comprises using the closed-loop controller 100 of FIGS. 2 and 3, e.g., using the modified FOC controller 200 of FIG. 3, to implement the method of aligning the stationary rotor at a configured rotor angle (θ) either after the motor has stopped synchronous operation and the rotor has become stationary and is no longer being driven or just prior to normal start-up of the motor, i.e., just prior to the motor being driven in accordance with the normal start-up operation. The closed-loop controller 100 may, as mentioned above, comprise any known, suitable closed-loop controller for synchronous operation and may comprise the FOC controller 200 as described in "Sensorless Field Oriented Control of PMSM Motors" of paper AN1078 or as described in the publication entitled "Sensorless PMSM Field-Oriented Control", the FOC controller 200 being suitably modified or reconfigured to implement the method of determining the motor angle and/or initial speed directly from the stator winding currents.

In another broad aspect, a closed-loop method of starting a synchronous motor comprises first implementing the method steps of the first main aspect of the invention and then controlling start-up of the motor using a closed-loop synchronous operation motor control algorithm based on the predetermined, selected, or specified rotor angle (θ).

The present invention therefore also seeks to supplement the known closed-loop method for operating a synchronous motor, especially a PMSM, by the method of parking the stationary rotor of the motor at the user-specified or configured rotor angle (θ) and subsequently using the parked rotor angle (θ) as an input to the closed-loop operation method on motor start-up. The modified or reconfigured closed-loop controller 100/200 of FIGS. 2 and 3 is arranged to implement the method of aligning the stationary rotor with the configured rotor angle (θ) based on a user-specified rotor angle (θ) which may comprise the configured rotor parking angle (θ) for the motor. The user-specified rotor parking angle (θ) can be specified using a user-specified value of a two-axis synchronously rotating reference frame vector voltage (V) for a selected one of two axis of the two-axis synchronously rotating reference frame of the motor. It will be appreciated, however, that the user may input a specified rotor parking angle (θ) into the closed-loop controller 100/200 with the closed-loop controller 100/200 being configured to determine a corresponding value of the two-axis synchronously rotating reference frame vector voltage (V) for the selected one of two axis which, when implemented by the closed-loop controller 100/200 on the motor, causes the stationary rotor to be rotated from its unknown stationary position (rotor angle) to the configured rotor parking angle. The closed-loop controller 100/200 uses the user-specified rotor parking angle (θ) or the user-specified value of the two-axis synchronously rotating reference frame vector voltage (V) for the selected one of the two axis to determining corresponding polyphase drive voltages for the synchronous motor. The closed-loop controller 100/200 then applies said polyphase drive voltages for a predetermined, selected, or calculated time period to cause the stationary rotor to be rotated from its unknown stationary position (unknown rotor angle) to the configured rotor parking angle (θ).

Consequently, after synchronous operation of the motor, an initial standstill rotor angle on initiation of motor start-up comprises the configured rotor parking angle (θ). The configured rotor angle (θ) can be stored in the memory 130 and recalled when needed on initiation of start-up of the motor 10.

Preferably, the predetermined, selected, or calculated time period to cause the stationary rotor to rotate to align said rotor with said configured rotor angle (θ) is predetermined, selected or calculated to be just sufficient to bring the stationary rotor into alignment with said configured rotor angle (θ). This is preferred because, once the rotor has been caused to rotate from its unknown rotor angle to the configured rotor angle (θ), the rotor will cease to rotate further, but will maintain its alignment with the configured rotor angle (θ). Consequently, any further application of the polyphase drive voltages will not cause any further rotation of the rotor past the configured rotor angle (θ), but it may cause heating of the stator windings which should preferably be avoided or at least minimized.

A preferred method of avoiding, reducing, or minimizing heating of the stator windings in the method of the invention comprises, for each implementation of the step of causing the rotor to rotate from its unknown stationary rotor angle to the configured rotor angle (θ), determining a least time period necessary for the stationary rotor to come into alignment with said configured rotor angle (θ). This may be achieved by detecting, for each implementation, the time period for the rotor to rotate from its unknown stationary rotor angle to the configured rotor angle (θ) and storing said time periods in the memory of the closed-loop controller 100/200. Then, calculating from the stored time periods the least time period necessary for the stationary rotor to successfully come into alignment with said configured rotor angle (θ) for all stored implementations, i.e., the least time period which ensures that all implementations are successful, but which at least reduces any residual periods of heating of the stator windings after successful alignment of the rotor with the configured rotor angle (θ). The method may include using a machine algorithm to determine, based on the stored time periods, a new value as the least time period for applying the polyphase drive voltages to achieve at least the objectives of rotating the stationary rotor to align said rotor with said configured rotor angle (θ) whilst avoiding, reducing, or minimizing heating of the stator windings.

In one embodiment of the method, the method of aligning the stationary rotor with the configured rotor angle (θ) is implemented a short time after the rotor has become stationary following synchronous operation of the motor. This is advantageous for motors operating at fixed locations which are less susceptible to shocks and knocks.

In contrast, the method may be implemented a short time before start-up of the motor for synchronous operation, i.e., as an initial step of the motor start-up procedure for synchronous operation.

In some embodiments, the module 140 may comprise a rotor position and speed estimation module 140 of the modified FOC controller 200 of FIG. 3 and the configured rotor parking angle (θ) determined in accordance with the invention may comprise an input to the module 140.

In some embodiments, the module 140 may comprise a rotor flux observer module 150 of a type as described in pages 1-3 of the publication entitled "improved Rotor Flux Observer for Sensorless Control of PMSM With Adaptive Harmonic Elimination and Phase Compensation" authored by Wei Xu et al, CES Transactions on Electrical Machines and Systems, vol. 3, no. 2. June 2019, the content of which is herein incorporated by reference.

In some embodiment, the method may include monitoring the stator winding current during implementation of the method according to the invention to detect of said stator winding current remains below an over-current protection threshold for the motor. In the case where the stator winding current exceeds the motor over-current protection threshold, the method is terminated.

The closed-loop motor operating method according to the invention can be utilized in synchronous motors 10 with various stator winding configurations as illustrated by FIGS. 4-5 and 10-13.

Figure 4:
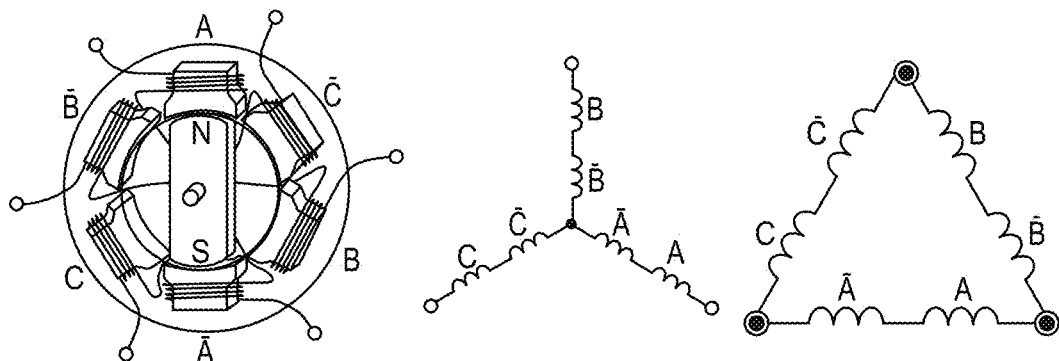
FIG. 4 is a schematic diagram showing the delta and star (or Y) stator windings configurations of a three-phase synchronous motor in which the closed-loop start-up method in accordance with the invention can be implemented.
Figure 5:
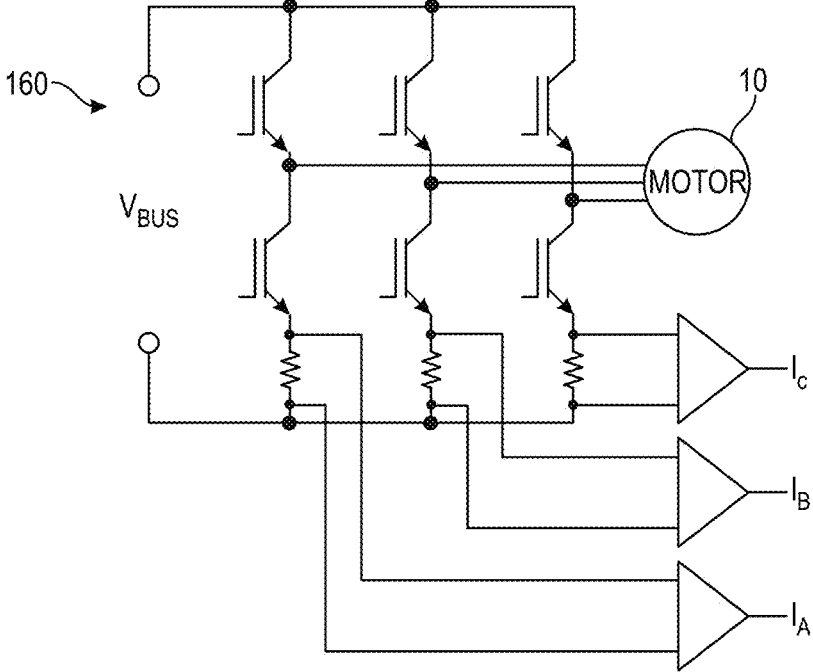
FIG. 5 is a schematic block diagram of a power stage for the closed-loop motor control system in accordance with the invention for the three-phase synchronous motor of FIG. 4.

FIG. 4 is a schematic diagram showing the conventional delta and star (or Y) stator windings configurations of the three-phase synchronous motor 10 whilst FIG. 5 provides a schematic block diagram of a three-phase power stage/bridge 160 for the closed-loop controller 100/200 for the synchronous motor 10 of FIG. 4. Two or more of the outputs of the 3-phase bridge module 160 of the closed-loop controller 100/200 of FIG. 5 comprising two or more of the sensed currents denoted as "$I_A$", "$I_B$" and "$I_C$" in FIG. 3 are fed to the Clarke Transform module 170 of the closed-loop controller 100/200 for processing. Typically, the sensed currents "$I_A$", "$I_B$" are selected for the Clarke Transform module 170.

Figure 6:
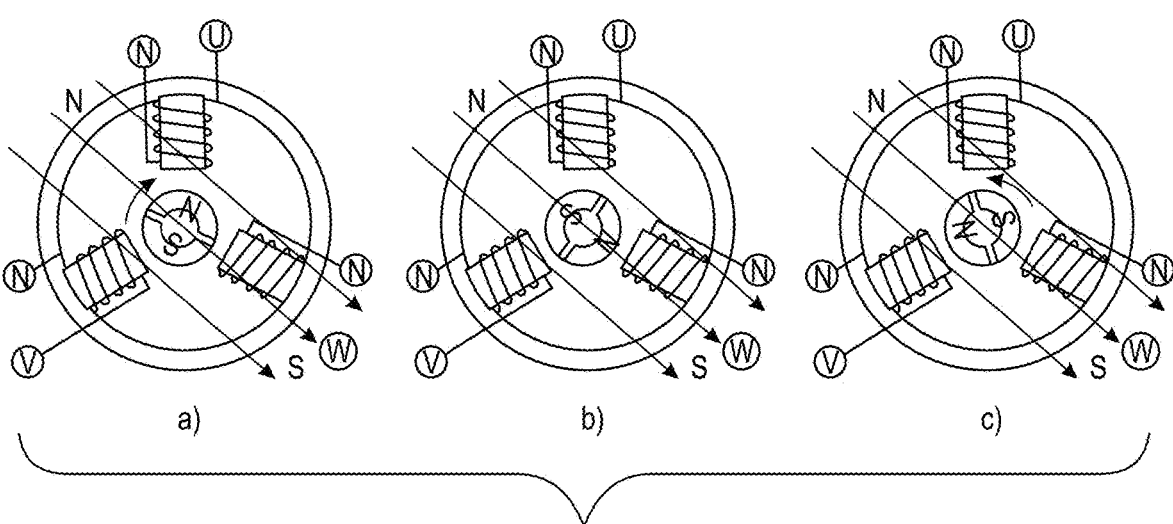
FIG. 6 illustrates alignment of rotor and stator magnetic fields in a three-phase synchronous motor.

FIG. 6 illustrates alignment of rotor and stator magnetic fields in the three-phase synchronous motor 10. The torque produced by the motor 10 includes a reaction torque component created by the reaction between the permanent magnets 14 of the rotor 12 and the stator windings 18 and a reluctance torque component generated as a result of the magnetic field minimizing the reluctance of its flux path. Both of these torque components are a function of the alignment between the rotor 12 and the stator 16. When the flux created by the stator 16 passes through the axis of the rotor 12, the rotor 12 and the stator 16 magnetic fields are in alignment. In FIG. 6*a*), the rotor 12 and the stator 16 magnetic fields are not yet in alignment and the arrow indicates the direction the rotor must rotate to achieve alignment. In FIG. 6*b*), the rotor 12 and the stator 16 magnetic fields are in alignment. In FIG. 6*c*), the rotor 12 and the stator 16 magnetic fields are not yet in alignment and the arrow indicates the direction the rotor must rotate to achieve alignment. It can be deduced from FIGS. 6*a*) to c) that there is a relationship of the configured rotor parking angle (θ) with a predetermined/specified value of the two-axis synchronously rotating reference frame vector voltage (V) for a selected one of the two axis of the two-axis synchronously rotating reference frame of the motor 10.

Figure 7:
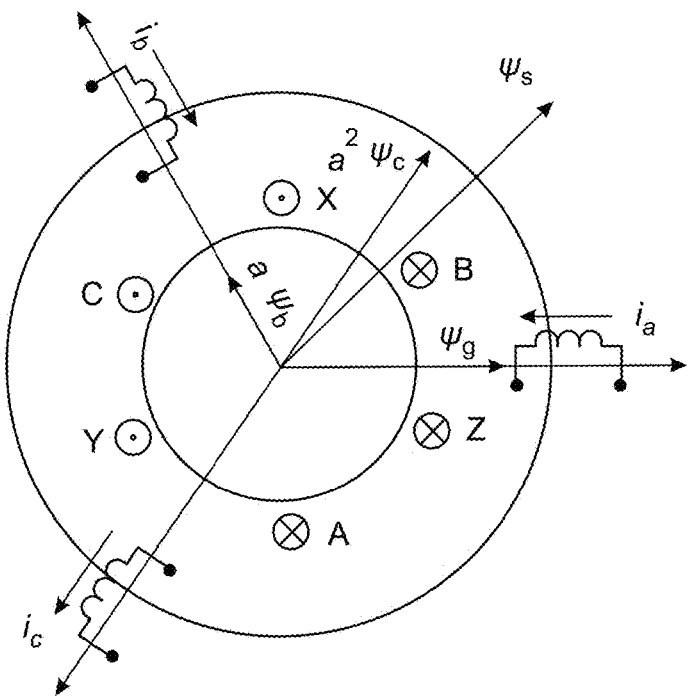
FIG. 7 is a vector current diagram for a three-phase synchronous motor.

FIG. 7 is the vector current diagram for the three-phase synchronous motor 10. The stator windings 18 are spatially separated by 120°. When the motor 10 is operating and the three phases U, V, W are being driven, the three phase currents $i_a$, $i_b$, $i_c$ are also separated in phase by 120°. The stator vector current ($i_s$) in the synchronously rotating two-dimensional (2D) orthogonal reference frame (d-q) is given by:

$$i_s = \sqrt{\frac{2}{3}} \left( i_a + a i_b + a^2 i_c \right).$$

The vector flux of the stator 16 in the synchronously rotating 2D orthogonal reference frame (d-q) is given by:

$$\Psi_a = \Psi \cos(\varphi) e^{j0°}$$

$$\Psi_b = \Psi \cos(\varphi - 120°) e^{j120°}$$

$$\Psi_c = \Psi \cos(\varphi - 240°) e^{j240°}$$

Figure 8A:
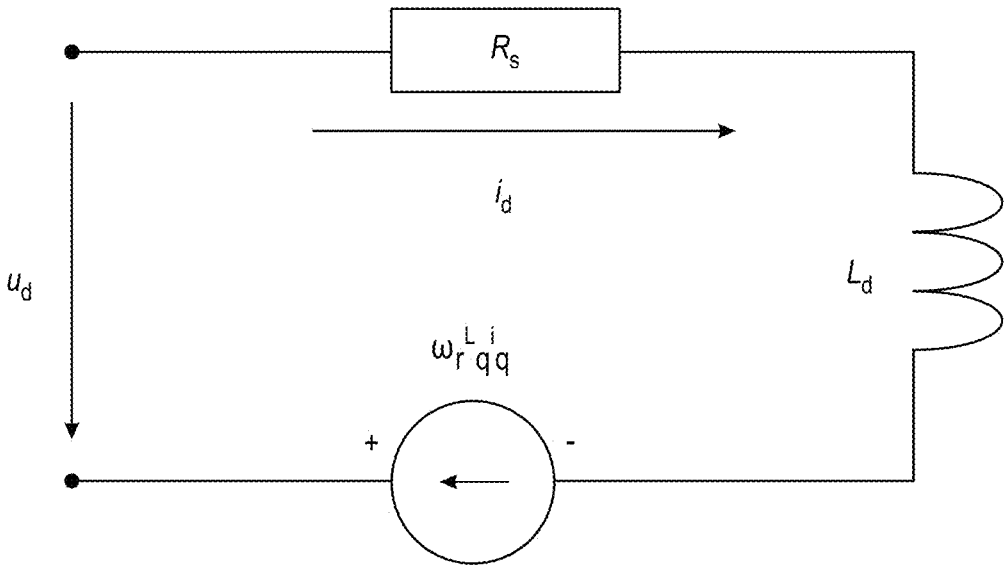
FIG. 8A is a voltage equivalent circuit in the d-axis for a three-phase synchronous motor and FIG. 8B is a voltage equivalent circuit in the q-axis for the three-phase synchronous motor.

FIG. 8A provides the voltage equivalent circuit in the d-axis for the three-phase synchronous motor 10 whilst FIG.

8B provides the voltage equivalent circuit in the q-axis for the three-phase synchronous motor 10.

In FIG. 8A, the phase voltage in the d-axis is given by:

$$u_d = R_s i_d + L_d \frac{di_d}{dt} - \omega_r L_q i_q.$$

Figure 8B:
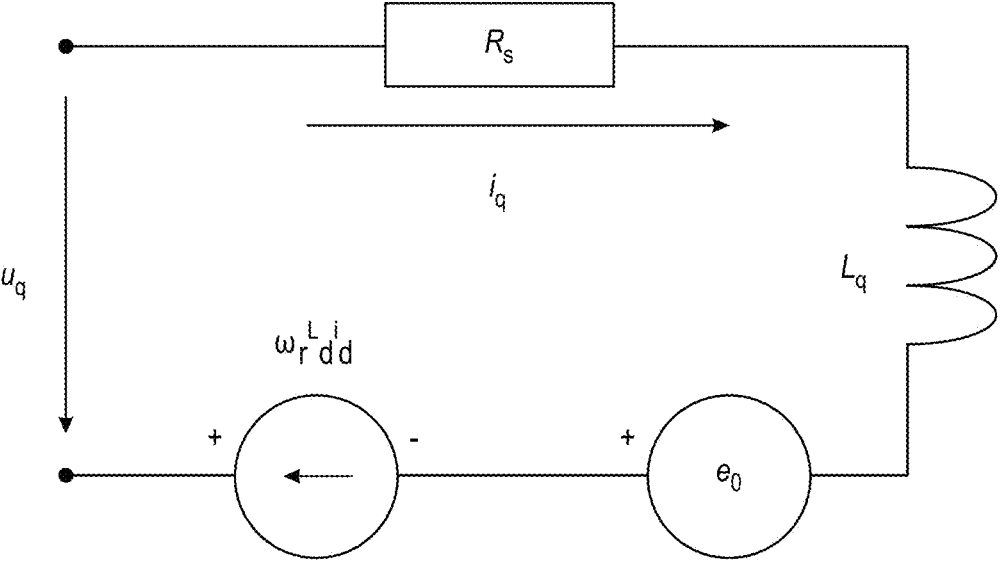

In FIG. 8B, the phase voltage in the q-axis is given by:

$$u_q = R_s i_q + L_q \frac{di_q}{dt} - \omega_r L_q i_q + e_0.$$

Figure 9:
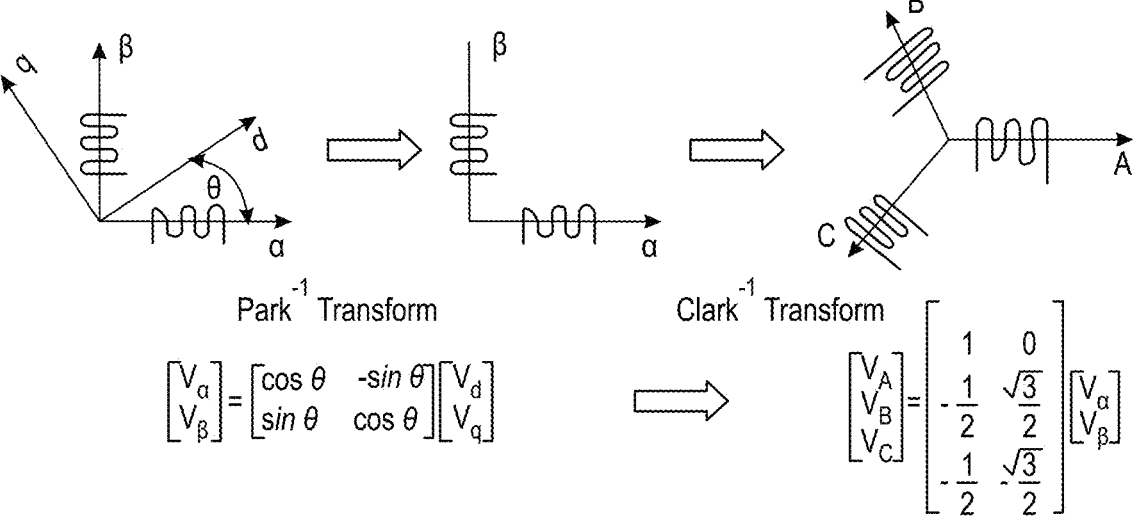
FIG. 9 illustrates the voltage transformation from the d-q coordinate system to the a-β coordinate system in determining the voltages to be applied in the three-phase motor coordinate system for aligning the rotor to a specified angle.

FIG. 9 illustrates the voltage transformation from the synchronously rotating 2D orthogonal reference frame (d-q) to a 2D orthogonal stationary alpha-beta (α-β) motor reference frame and from the 2D orthogonal stationary alpha-beta (α-β) motor reference frame to the three-phase coordinate system of the motor 10. The two transformations comprise an inverse Park transformation followed by an inverse Clarke transformation.

Normal synchronous vector control of a synchronous motor can be summarized as follows:

(i) The 3-phase stator currents are measured. These measurements typically provide values for $i_a$ and $i_b$. $i_c$ is calculated because $i_a$, $i_b$ and $i_c$ have the following relationship:

$i_a + i_b + i_c = 0.$ (ii) The 3-phase currents are converted to a two-axis system. This conversion provides the variables $i_\alpha$ and $i_\beta$ from the measured $i_a$ and $i_b$ and the calculated $i_c$ values. $I_\alpha$ and $i_\beta$ are time-varying quadrature current values as viewed from the perspective of the stator, i.e., a two-dimensional stationary orthogonal reference frame or coordinate system.

(iii) The two-axis coordinate system is rotated to align with the rotor flux using a transformation angle calculated at the last iteration of the control loop. This conversion provides the $I_d$ and $I_q$ variables from $i_\alpha$ and $i_\beta$. $I_d$ and $I_q$ are the quadrature currents transformed to the rotating coordinate system, a two-dimensional rotating orthogonal reference frame or coordinate system. For steady state conditions, $I_d$ and $I_q$ are constant.

(iv) Error signals are formed using $I_d$, $I_q$ and reference values for each.

The $I_d$ reference controls rotor magnetizing flux.

The $I_q$ reference controls the torque output of the motor.

The error signals are input to PI controllers.

The output of the controllers provides $V_d$ and $V_q$, which is a voltage vector that will be sent to the motor.

(v) A new transformation angle is estimated where $v_\alpha$, $v_\beta$, $i_\alpha$ and $i_\beta$ are the inputs. The new angle guides the FOC algorithm as to where to place the next voltage vector.

(vi) The $V_d$ and $V_q$ output values from the PI controllers are rotated back to the stationary reference frame using the new angle. This calculation provides the next quadrature voltage values $v_\alpha$ and $v_\beta$.

(vii) The $v_\alpha$ and $v_\beta$ values are transformed back to 3-phase values $v_a$, $v_b$ and $v_c$. The 3-phase voltage values are used to calculate new PWM duty cycle values that generate the desired voltage vector. The entire process of transforming, PI iteration, transforming back and generating PWM is schematically illustrated in FIG. 3.

If, in the method of the invention, the alignment of the motor 10 in the synchronously rotating 2D orthogonal reference frame (d-q) is considered during steady-state operation when the rotor is stationary, there is no movement or phase current change. Consequently, selecting the q-axis, it is possible to ignore any vector current in the d-axis. Therefore, when the q-axis is selected, it is only necessary in the method of the invention to apply the specified value of the vector voltage ($V_q$) in the q-axis which comprises a product of the stator winding resistance ($R_s$) and the stator winding current ($i_q$) in the q-axis, i.e.:

$V_q = R_s{}^*i_q$; where $R_s$ comprises the resistance of the stator windings.

The resistance of the stator windings $R_s$ will be known for the motor 10 or can be measured as an operating parameter of the motor 10. The measurement of the the stator windings $R_s$ need only be done once, but it could be done periodically over the lifetime of the motor 10 to account for any wear and/or deterioration in the stator windings. In the latter case, the method of the invention may be implemented using any update value for the the stator windings $R_s$. Where θ is the configured rotor parking angle, the three-phase drive voltages for parking the rotor 12 at the configured rotor angle θ can be determined from $V_q = R_s{}^*i_q$ where $V_q$ and $R_s$ are both known by firstly applying the inverse Park transformation and then applying the inverse Clarke transformation to yield:

$$Va = -\sin\theta V_q;$$

$$Vb = \tfrac{1}{2}\sin\theta V_q + V^{3}\!/\!2\ \cos\theta V_q;$$

$$Vc = \tfrac{1}{2}\sin\theta V_q - V^{3}\!/\!2\ \cos\theta V_q.$$

where $V_q$ is set as the force applied at the stator 16 and θ is the configured rotor angle. Suitable pulse wave modulated (PWM) drive signals can be generated by the closed-loop controller 100/200 for the synchronous motor 10 from the three-phase voltage equalities for driving respective drive transistors in the power circuit of FIG. 5.

If, in the method of the invention, the d-axis is selected, it is possible to ignore any vector current in the q-axis. Therefore, when the d-axis is selected, it is only necessary in the method of the invention to apply the specified value of the vector voltage ($V_d$) in the d-axis which comprises a product of the stator winding resistance ($R_s$) and the stator winding current ($i_d$) in the d-axis, i.e.:

$V_d = R_s{}^*i_d$; where $R_s$ comprises the resistance of the stator windings.

Where θ is the configured rotor parking angle, the three-phase drive voltages for parking the rotor 12 at the configured rotor angle θ can be determined from $V_d = R_s{}^*i_d$ where $V_d$ and $R_s$ are both known by firstly applying the inverse Park transformation and then applying the inverse Clarke transformation to yield:

$$Va = \cos\theta V_d;$$

$$Vb = -\tfrac{1}{2}\cos\theta V_d + V3/2\ \sin\theta V_d;$$

$$Vc = -1/2\ \cos\theta V_d - V3/2\ \sin\theta V_d.$$

where $V_d$ is set as the force applied at the stator 16 and θ is the configured rotor angle. Suitable pulse wave modulated (PWM) drive signals can be generated by the closed-loop controller 100/200 for the synchronous motor 10 from the three-phase voltage equalities for driving respective drive transistors in the power circuit of FIG. 5.

Consequently, the method of the invention provides a method of deriving polyphase drive voltages for causing the stationary rotor 12 to rotate and align with configured/specified rotor angle (θ).

The invention also provides a closed-loop method of starting the synchronous motor 10 by parking the rotor 12 at the specified/configured rotor angle (θ) and subsequently controlling start-up of the motor 10 using the closed-loop motor controller 100/200 with the specified/configured rotor angle (θ) as an input. This solves many problems with conventional synchronous motors having a having a sensorless closed-loop motor controller where the initial start-up position of the rotor is unknown.

The invention also provides a sensorless closed-loop controller 100/200 for a synchronous motor 10 for aligning the rotor 12 of the motor 10 in accordance with the afore-described method of the invention.

Whilst the method as hereinbefore described has been described with respect to a three-phase synchronous motor 10, the method of the invention may be adapted to other motor configurations as shown in FIGS. 10-13.

Figures 10, 11:
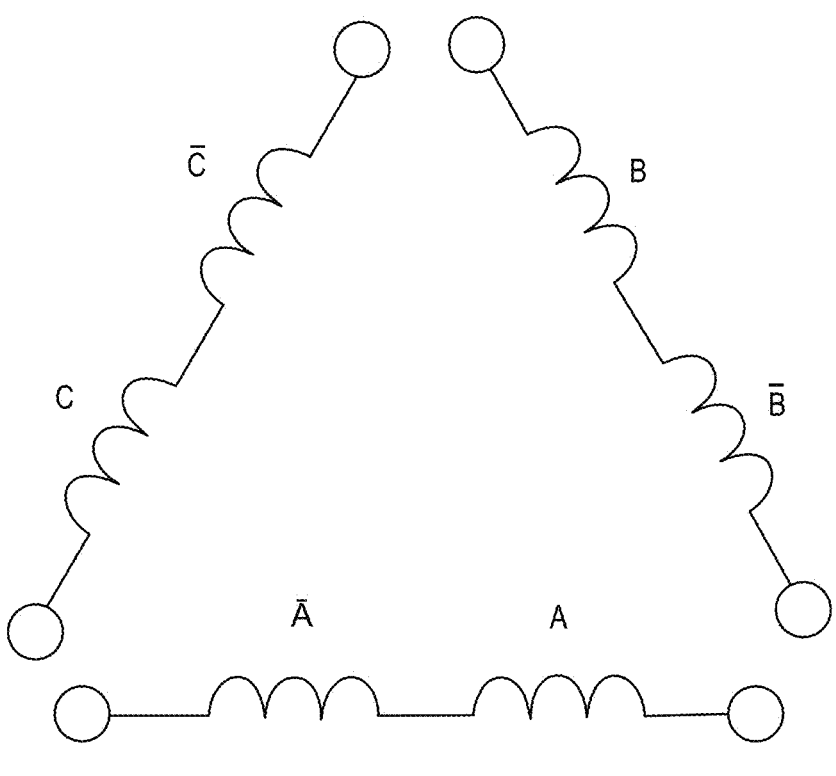
FIG. 10 is a schematic diagram showing a six-wire configuration of stator windings of a three-phase synchronous motor in which the closed-loop start-up method in accordance with the invention can be implemented.
FIG. 11 is a schematic block diagram of a power stage for the closed-loop motor control system in accordance with the invention for the three-phase synchronous motor of FIG. 10.

In contrast to FIG. 4, FIG. 10 provides a schematic diagram showing a six-wire configuration of the stator windings 18 of the synchronous motor 10 whilst FIG. 11 provides a schematic block diagram of a 3-phase power stage/bridge 160 for the closed-loop controller 100/200 for the synchronous motor 10 with this stator winding configuration. The six-wire stator winding configuration results from none of the three stator windings 18 having any common connection points in contrast to the conventional delta or star stator winding configurations of FIG. 4 which have at least one common connection point between at least two of the stator windings 18.

FIG. 12 provides a schematic diagram showing a four-wire configuration of 2-phase stator windings 18 of the synchronous motor 10 in which the closed-loop start-up method in accordance with the invention can be implemented. FIG. 13 provides a schematic block diagram of a power stage/bridge 160 for the closed-loop motor controller 100/200 in which the sensed currents "$I_A$", "$I_B$" are fed into the Clarke Transform module.

The present invention also provides a non-transitory computer-readable medium storing machine-readable instructions, wherein, when the machine-readable instructions are executed by the processor of the closed-loop motor controller 100/200, they configure the processor to implement the concepts of the present invention.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of aligning a rotor of a polyphase synchronous motor having a permanent magnet rotor to a user-configured rotor angle ($\theta$), the method being applied after the rotor has stopped synchronous operation and has become stationary and is no longer being driven and prior to closed-loop synchronous start-up of the motor, the method comprising the steps of:
   receiving a user-configured rotor angle ($\theta$);
   based on said received user-configured rotor angle ($\theta$),
      deriving a two-axis vector voltage (V) defined in a synchronously rotating reference frame aligned to the user-configured rotor angle ($\theta$);
   transforming the two-axis vector voltage into corresponding polyphase drive voltages for the synchronous motor using an inverse Park transform; and
   applying said polyphase drive voltages for a calculated time period, the time period being calculated to rotate the stationary rotor from an arbitrary initial position to the user-configured rotor angle ($\theta$) to align the stationary rotor with said user-configured rotor angle ($\theta$).

2. The method of claim 1, wherein the step of transforming the two-axis vector voltage (V) into corresponding polyphase drive voltages comprises transforming the two-axis vector voltage (V) to a two-axis orthogonal stationary alpha-beta ($\alpha$-$\beta$) motor reference frame and then transforming the two-axis orthogonal stationary alpha-beta ($\alpha$-$\beta$) motor reference frame to a polyphase motor coordinate system.

3. The method of claim 2, wherein the step of transforming the two-axis vector voltage (V) to the two-axis orthogonal stationary alpha-beta ($\alpha$-$\beta$) motor reference frame system comprises using an inverse Park transformation.

4. The method of claim 2, wherein the step of transforming the two-axis orthogonal stationary alpha-beta ($\alpha$-$\beta$) motor reference frame to the polyphase motor coordinate system comprises using an inverse Clarke transformation to thereby provide the corresponding polyphase drive voltages for the synchronous motor for the user-configured rotor angle ($\theta$).

5. The method of claim 1, wherein the method includes determining from the corresponding polyphase drive voltages for the synchronous motor for the user-configured rotor angle ($\theta$) pulse wave modulated (PWM) signals for driving drive transistors for each phase of the synchronous motor to align the stationary rotor with said user-configured rotor angle ($\theta$).

6. The method of claim 1, wherein synchronous motor is a three-phase synchronous motor, the two-axis vector voltage (V) is defined for a selected one of two axis of the synchronously rotating reference frame, the selected axis of the two-axis synchronously rotating reference frame is comprising the d-axis, and the corresponding polyphase drive voltages for the synchronous motor are determined from:

$$Va = \cos\theta V_d;$$

$$Vb = -\tfrac{1}{2}\cos\theta V_d + \sqrt{3}/2\,\sin\theta V_d;$$

$$Vc = -\tfrac{1}{2}\cos\theta V_d - \sqrt{3}/2\,\sin\theta V_d.$$

7. The method of claim 6, wherein a value of vector current $i_d$ applied by the stator windings by the polyphase drive voltages is determined from:

$$i_d = V_d/R_s;$$

where $R_s$ comprises the resistance of the stator windings.

8. The method of claim 7, wherein the method includes ignoring any stator winding current ($i_q$) in the q-axis of the synchronously rotating reference frame when determining the synchronously rotating reference frame vector current ($i_d$).

9. The method of claim 1, wherein the synchronous motor is a three-phase synchronous motor, the two-axis vector voltage (V) is defined for a selected one of two axis of the synchronously rotating reference frame, the selected axis comprises the q-axis, and the corresponding polyphase drive voltages for the synchronous motor are determined from:

$$Va = -\sin\theta V_q;$$

$$Vb = \tfrac{1}{2}\sin\theta V_q + \sqrt{3}/2\,\cos\theta V_q;$$

$$Vc = \tfrac{1}{2}\sin\theta V_q - \sqrt{3}/2\,\cos\theta V_q.$$

10. The method of claim 9, wherein a value of vector current $i_q$ applied by the stator windings by the polyphase drive voltages is determined from:

$$I_q = V_q/R_s;$$

where $R_s$ comprises the resistance of the stator windings.

11. The method of claim 10 wherein the method includes ignoring any stator winding current ($i_d$) in the d-axis of the synchronously rotating reference frame when determining the synchronously rotating reference frame vector current ($i_q$).

12. The method of claim 1, wherein said calculated time period to rotate the stationary rotor to align said rotor with said user-configured rotor angle ($\theta$) is calculated to be just sufficient to bring the stationary rotor into alignment with said configured rotor angle ($\theta$).

13. The method of claim 12, wherein the method comprises, for each implementation of the step of rotating the stationary rotor to align said rotor with said user-configured rotor angle ($\theta$), determining a time period for the stationary rotor to come into alignment with said user-configured rotor angle ($\theta$); and storing said time periods; the method including using a machine algorithm to determine, based on the stored time periods, a new value for the calculated time period to apply the polyphase drive voltages to rotate the stationary rotor to align said rotor with said user-configured rotor angle ($\theta$).

14. The method of claim 1, wherein the method of aligning the stationary rotor with the user-configured rotor angle ($\theta$) is implemented a short time after the rotor has become stationary following synchronous operation of the motor.

15. The method of claim 1, wherein the method of aligning the stationary rotor with the user-configured rotor angle ($\theta$) is implemented a short time before start-up of the motor for synchronous operation is implemented.

16. The method of claim 1, wherein the user-specified two-axis vector voltage (V) defined in the synchronously rotating reference frame is selected as a value which comprises a user-specified rotor angle ($\theta$) as the user-configured rotor angle ($\theta$).

17. A method of starting a synchronous motor having a permanent magnet rotor, the method being applied after the rotor has stopped synchronous operation and has become stationary and is no longer being driven and prior to closed-loop synchronous start-up of the motor, the method comprising the steps of:

receiving a user-configured rotor angle ($\theta$);

based on said received user-configured rotor angle ($\theta$), deriving a two-axis vector voltage (V) defined in a synchronously rotating reference frame aligned to the user-configured rotor angle ($\theta$);

transforming the user-specified two-axis vector voltage (V) into corresponding polyphase drive voltages for the synchronous motor using an inverse Park transform; and applying said polyphase drive voltages for a calculated time period, the time period being calculated to rotate the stationary rotor from an arbitrary initial position to the user-configured rotor angle to rotate the stationary rotor to align said rotor with said user-configured rotor angle ($\theta$) and controlling start-up of the motor using a closed-loop synchronous operation motor control algorithm based on the user-configured rotor angle ($\theta$).

18. A closed-loop controller for a synchronous motor having a permanent magnet rotor, said controller comprising a non-transitory computer-readable medium storing machine-readable instructions and a processor, wherein, when the machine-readable instructions are executed by said processor, they configure the controller to park the stationary rotor at a configured rotor angle ($\theta$) by:

receiving a user-configured rotor angle ($\theta$);

based on said received user-configured rotor angle ($\theta$), deriving a two-axis vector voltage (V) defined in a synchronously rotating reference frame aligned to the user-configured rotor angle ($\theta$);

transforming the two-axis vector voltage into corresponding polyphase drive voltages for the synchronous motor using an inverse Park transform; and applying said polyphase drive voltages for a calculated time period, the time period being calculated to rotate the stationary rotor from an arbitrary initial position to the user-configured rotor angle ($\theta$) to align said rotor with said user-configured rotor angle ($\theta$).

19. The closed-loop controller of claim 18, wherein the synchronous motor is any of a brushless DC (BLDC) motor or a permanent magnet synchronous motor (PMSM).

20. The closed-loop controller of claim 18, wherein the synchronous motor comprises a three-wire stator configuration, a four-wire stator configuration or a six-wire stator configuration.

21. A method of aligning a stationary rotor of a polyphase synchronous motor having a permanent magnet rotor to a user-specified rotor parking angle ($\theta$), the method being applied after the rotor has stopped synchronous operation and has become stationary and is no longer being driven and prior to synchronous closed-loop start-up of the motor, the method comprising the steps of:

receiving a user-specified rotor angle ($\theta$);

based on said received user-specified rotor angle ($\theta$), deriving a two-axis vector voltage (V) defined in a synchronously rotating reference frame aligned to the user-specified rotor angle;

transforming the two-axis vector voltage (V) into corresponding polyphase drive voltages for the synchronous motor using an inverse Park transform; and applying said polyphase drive voltages for a calculated time period, the time period being calculated to rotate the stationary rotor from an arbitrary initial position to the user-specified rotor angle ($\theta$) to align said rotor with said user-specified rotor angle ($\theta$).

* * * * *